(12) United States Patent
Pérez Hinojosa

(10) Patent No.: US 8,410,201 B2
(45) Date of Patent: Apr. 2, 2013

(54) PROCEDURE FOR PREPARATION OF A REFLECTIVE AND OXIDE INHIBITING COATING

(76) Inventor: Ulises Eladio Pérez Hinojosa, Nuevo León (MX)

( * ) Notice: Subject to any disclaimer, the term of this patent is extended or adjusted under 35 U.S.C. 154(b) by 0 days.

(21) Appl. No.: 13/180,573

(22) Filed: Jul. 12, 2011

(65) Prior Publication Data

US 2013/0018129 A1    Jan. 17, 2013

(51) Int. Cl.
*C09D 5/00* (2006.01)
*C08K 5/00* (2006.01)
*C08K 31/00* (2006.01)

(52) U.S. Cl. .......... 524/83; 524/556; 524/522; 524/386; 524/379; 524/436; 524/502; 524/515; 524/539

(58) Field of Classification Search .................. 524/83, 524/556, 522, 386, 379, 436, 502, 515, 539
See application file for complete search history.

(56) References Cited

U.S. PATENT DOCUMENTS

| | | | |
|---|---|---|---|
| 8,211,961 B1 * | 7/2012 | Perez Hinojosa | 524/83 |
| 8,242,200 B2 * | 8/2012 | Perez-Hinojosa | 524/522 |
| 2006/0021148 A1 * | 2/2006 | Weller | 5/698 |
| 2007/0049496 A1 * | 3/2007 | Messerschmidt et al. | 504/357 |
| 2007/0092544 A1 * | 4/2007 | Mills | 424/405 |
| 2010/0152366 A1 * | 6/2010 | Perez-Hinojosa | 524/556 |

* cited by examiner

*Primary Examiner* — Robert D. Harlan
(74) *Attorney, Agent, or Firm* — Defillo & Associates, Inc; Evelyn A. Defillo

(57) ABSTRACT

The present invention refers a procedure for preparation of a reflective and oxide inhibiting coating consists of adding hard water, a series of compounds such as titanium dioxide, calcium hydroxide at 95%, an acrylic polymer, hydroxy methyl cellulose, sodium hexametaphosphate at 10% y monoethylen glycol, maintaining specific conditions of pH and viscosity during process. The resulting coating of this process, presents highly adhesive actions, as well as a high level of reflection to solar rays, which place it as a oxide inhibitor, that no require previous sealed when it is applied to steel and/or galvanize surfaces.

2 Claims, No Drawings

PROCEDURE FOR PREPARATION OF A REFLECTIVE AND OXIDE INHIBITING COATING

FIELD OF THE INVENTION

The present invention refers a procedure for preparation of a reflective and oxide inhibiting coating, and its composition, which for its components and physical and chemical characteristics, is easy to apply, durable and with excellent reflective and adherence properties.

BACKGROUND OF THE INVENTION

At present in state of art related to coating with reflective and anti-corrosive or rust inhibitor properties, with a similar composition obtained by the process of the present invention, and based on polymeric components with titanium dioxide, are divulged in some patents documents such as: CA1098257A1, U.S. Pat. No. 3,199,999, U.S. Pat. No. 4,232,062, U.S. Pat. No. 5,629,362 y WO9507766A1. Even when exist inventions related with reflective coatings that could have corrosion or rust inhibitor properties, none of them presents the composition, properties and advantages that are divulged here and will become apparent by a person with middle knowledge in the art, of the next description in a preferred embodiment of the invention.

Likewise, in a case where is wanted to coat a metal surfaces of steel and/or galvanized, should be considered next situations:

Being exposed to environmental conditions and without any coating protection, the humidity present in the environment causes oxidation and reduce the useful life of metal, requiring protection in places where is generally used slow and expensive cleaning procedures, for more information is mentioned some methods ASTM D4146-ASTM D1730, the prevent the corrosion, later an application of a primary anti-corrosive and at the end a paint coat such as alkidalic enamel, polyurethane, among others.

Being exposed to solar rays captured in ambient temperatures over 35° C., come to capture heat and increase its temperature over 60° C., being necessary the use of insulation systems, above due to the high thermal conductivity of the metal surfaces Regularly the coatings used do not inhibit the formation/generation of oxidation that causes corrosion and detachment of the film, and a reduction in the useful life of the coating and of the surface.

The problems expressed above served as a base for this invention taking a styrene acrylic polymer as a base and a calcium hydroxide chemically controlled with a concentration of 95%.

The calcium hydroxides have been used traditionally in the preparation of decorative coatings on roofs and walls. However in this type of coating observes some but very important disadvantages; to name some, the dusting of the finishing after application of the product, lack of resistance to weather changes, softening by rain, rigidity of the film by the solar rays attack, non controlled particles sizes on film (final finishing), the above serve as a base for this invention taking as a base calcium hydroxide processed and carried to a content of hydroxide chemically controlled, obtaining results that eliminates the problems mentioned before.

DETAILED DESCRIPTION

The present invention refers to a process for the preparation of a reflective and oxide inhibiting coating, and its composition, in which observes the effect of contacting calcium hydroxide at temperature of 10° a 60° C. chemically controlled at 95% with a mixture of esters cellulose, of high molecular weight and high unfold, hard acrylic polymer of linear chain in air presence relation, with a mixture of highly hard water without previous treatment.

At first, we add calcium hydroxide at 95% with a relation of pH 14 to 17 into a portion of a highly hard water, it adds an acrylic moisturizer, later it adds titanium dioxide, esters cellulose, hard acrylic polymer of linear chain, pH adjustment from 12.5 to 13.5 with buffer if necessary. Resulting a lightly exothermic reaction, which is packed for a later use.

The procedure for preparation of a reflective and oxide inhibiting coating comprises the next steps:

Pour hard water in a container

Add sodium hexametaphosphate (Mardupol®) in solution at 10%

Stir for 3 minutes and keep in repose for 5 minutes

Stir and add polyelectrolyte of carboxylate salt (Orotan®)

Stir for 5 minutes and keep in repose for 1 minute

Stir and add monoethylene glycol (Fortequim®)

Mix for 8 minutes and keep in repose for 2 minutes

Stir and add titanium dioxide

Mix for 15 minutes and keep in repose for 1 minute

Stir and add Calcium hydroxide at 95%

Mix for 10 minutes

Add hard styrene acrylic resin (Wyn®) and mix for 10 minutes

Add hydroxy methyl cellulose (Cellosize QPS 52000®)

The addition and mixture of every component is made under a stirring of 1200 rpm.

During all the process the pH has to be controlled in a range of 12.0 to 14.0, as well as viscosity, which has to be in a range of 3,000 to 5,000 cps (centipoise). The final viscosity of the product is in a range of 5,000 to 8,000 cps.

The finished product and prepared by this process has a fluid consistency, presenting a density of 1.2 Kg/L (1.2 g/cm$^3$), with a pH (1.0%) de 13±0.5, an humidity adsorption from 15 to 17%, solids contained of 60±−1.0%, and viscosity of 20,000 cps.

The final mixture, obtained in its preferred embodiment by the process mentioned before, in a volume of 19 L with a weight of 22.8 Kg at the end of mixing the components and after the repose of the mixture. According to the process a preferred mixture got the next composition (table 1):

TABLE 1

Components of the reflective and oxide inhibiting coating, obtained in the present invention

| | COMPONENT | Kg | % Weight |
|---|---|---|---|
| 1 | WATER | 11.240 | 59.1578 |
| 2 | OROTAN | 0.030 | 0.1578 |
| 3 | TITANIUM DIOXIDE | 0.100 | 0.5263 |
| 4 | CALCIUM HYDROXIDE | 1.500 | 7.8947 |
| 5 | HARD STYRENE ACRYLIC RESIN | 2.000 | 10.5263 |
| 6 | CELLOSIZE | 1.760 | 9.2631 |
| 7 | SODIUM HEXAMETAPHOSPHATE | 2.200 | 11.5789 |
| 8 | MONOETHYLEN GLYCOL | 0.170 | 0.8947 |

Components used were selected according chemical and purity properties according suppliers and trade names displayed next (table 2):

TABLE 2

Component list according trade name, related to a reflective and oxide inhibiting coating obtained in the procedure for this invention

| TRADE NAME | MANUFACTURER | USE | SPECIFICATIONS |
|---|---|---|---|
| OROTAN 731 - A | ROHMHAAS | DISPERSANT | Colour APHA/HAZEN PT-CO: 0.0-250.0, specific gravity: 1.078-1.114, pH diluted: 10.2-10.6, solids: 24-26%. viscosity brookfield: 20.0-130.0 cps |
| CALCIUM HYDROXIDE | PROVIDER CUITLAHUAC | FILLER | humidity: 1% (máx.), presentation: pakage de 25 Kg |
| SODIUM HEXAMETAPHOSPHATE | MARDUPOL | MOISTURIZED | IGNITION LOST: 0 50% (max.), insoluble substances: 010% (max.), Purity (as $P_2O_5$): 67.0% (min.). pH (solution al 1%): 6.5-7.1, physical aspecto: odorless white poder, impurities free |
| MONOETILENGLYCOL | FORTEQUIM | ANTIFREEZE | Density at 25° C.: 1.110 (+/−0.005) Kg/L, Purity by gas chromatography: 99% (min), Destillation Range: 186-198° C., Solubility: Humidity complete by Karl Fisher: 0 50% (max.) |
| CELLOSIZE QPS 52000 | MEXICAN POLYMERS CORPORATION | CELULÓSICO | Viscosity brookfield: 2,400-3,000 cps. Insolubility in water (aqueous solution at 1%): 0.0-1.0% in weight volatility (aqueous solution at 1%): 0.0-5.0% in weight, hydratation time (aqueous solution at 1%): 5.0-15.0% in weight |
| TITANIUM DIOXIDE R-902 | DUPONT | PIGMENT | Colour L: 99.20 (min.), Colour A: −0.9 a-0.3, relative tonality B: 1.60-2.80, Subtone smoke black: 100-140, Fineness Hegman: 7.00 (min.), Final point of particles counting: 4.00 (min.), Particles counting Scats: 150 (max.) brightness (20 grades): 60 (min.), Oil absorption: 13.0-20.0, pH: 7.3-9.5, Resistence 30° C.: 4.0 (min.) physical aspect: White powder, thin |
| HARD STYRENE ACRYLIC RESIN | WYN DE MÉXICO | LIGANTE ADHERENTE DE ALTA DUREZA | Solids: 54.0-56.0%, Viscosity: 1,000-2,000 cps, pH to25° C.: 4.0-5.0, presentation: drumm of 210 kg |

With the product obtained by the process described we give the next examples to illustrate the utility of the present invention, with no intention to limit the broad field of action.

It is worth mentioning that based on various trial and error test, performing variations in the aggregate and sequenced of the components, as well as the prime material changes, is obtaining a fluid and homogeneous coating, resulting of the addition of the components used which gives to the product a reflective, adherence and anti corrosion functions.

The advantages of the reflective and oxide inhibiting coating of the present invention were tested by field evaluation and some laboratory test:

Field evaluation 1: auto-regeneration analysis due to an auto-wash, that is a property obtained by the highly humidity assimilation (hydroscopy) of particles, no adhesion on film, no mating of particles existing on the liquid film in monolithic system.

Field evaluation 2: efficient inhibitor in the oxide generation in metal substrates, in this action it not requires additional additives to remain on the most of substrates this because of its high adherence property.

To support these field evaluations, were performed laboratory tests to the reflective and oxide inhibiting coating, obtained by the process of the present invention, mentioned below:

Adherence Test. Where to performed the mechanical test should be applied the product with a previous cleaning of the metal surface, repeating this action twice, leaving to dry about from 1 to 1.5 hours between repetitions; after total drying, performs a direct water contact over the application (at one meter of distance) using a high pressure water equipment of 590 Kg (1300 lbs). That test has a minimum time of 2 minutes without showing detachment of film.

Solar reflectance test. Where the coating applied and dry has to accomplish a high reflectance range, obtaining a result of 86.25% R according to the standard ASTM E903 related to a test method that covers the measurement of the spectral absorption, reflectance and transmittance of the materials through spectrophotometers equipped with integrating spheres (Standard test for solar reflectance, and transmittance of material using integrated spheres).

Thermal conductivity test to the reflective and oxide inhibiting coating. This test were compared with others reflective and corrosion or rust inhibitors of same thickness and volume. The thermal conductivity test to determine R factor (thermal resistance) and K factor (thermal conductivity factor) were performed in Research Center for Applied Chemistry (CIQA—Centro de Investigación Quimica Aplicada) of CONACYT, and for EMA laboratories, an IDESA company, based on standards NOM C-189, equivalent to ASTM C518, which is for insulating materials, therefore it measures the thermal transmission using a with a hot plate isolated device, being the average thermal conductivity of 0.06117842 Kcal/h m ° C. at 44.5° C. and 0.06479465 Kcal/h m ° C. to 54.8° C.

Thermal emittance test. Where the coating is applied and dry has to satisfy a high level of thermal emittance, the product achieves a result of 0.92 e according to the standard ASTM C1371 related with a method to determine the material emittance at room temperature using Portable Emissometers (Standard Test Method for Determination of Emittance of Materials Near Room Temperature Using Portable Emissometers).

Thermal behavior tests by DSC, TGA y TMA, which concludes that the coating is termostable up to 175° C., it soften up to 90° C., and presents a Young module of 388 psi at 25° C.

The present inventor concludes that this coating is very high whiteness, its chemical base reacts in water, that's the reason for the thermal transmission is lower than any other coating decreasing the temperature on metal surfaces from 15 to 20° C. during 3 years after application.

Even when the present invention has been described respect some preferred embodiments, it is obvious that alterations and equivalent modifications can be proposed by skilled person in the field, after reading and understanding the description, therefore is understood that this invention is not limited to that was illustrated in the figures, but the scope of the claims.

What is claimed is:

1. A composition of a reflective and oxide inhibiting coating comprising in weight percent:

| | | |
|---|---|---|
| a) | water | 59.1578% |
| b) | carboxylate salt | 0.1578% |
| c) | titanium dioxide | 0.5263% |
| d) | calcium hydroxide | 7.8947% |
| e) | styrene acrylic resin | 10.5263% |
| f) | hydroxy methyl cellulose | 9.2631% |
| g) | sodium hexametaphosphate | 11.5789% |
| h) | monoethylen glycol | 0.8947%. |

2. The composition of claim 1, wherein the composition has a fluid consistency, a density of 1.2 Kg/L, a pH (1.0%) of 13±0.5, an adsorption from 15 to 17%, solids contained of 60±−1.0%, and a viscosity of 20,000 cps.

* * * * *